(12) United States Patent
Vandermeer et al.

(10) Patent No.: US 10,960,931 B2
(45) Date of Patent: Mar. 30, 2021

(54) ATTACHMENT AND CONNECTING STRUCTURE FOR VEHICLE COMPONENT

(71) Applicant: DENSO International America, Inc., Southfield, MI (US)

(72) Inventors: John Vandermeer, Royal Oak, MI (US); Jacob Wright, Royal Oak, MI (US); Teodor Bogdan, Oxford, MI (US)

(73) Assignee: DENSO International America, Inc., Southfield, MI (US)

( * ) Notice: Subject to any disclaimer, the term of this patent is extended or adjusted under 35 U.S.C. 154(b) by 188 days.

(21) Appl. No.: 16/229,624

(22) Filed: Dec. 21, 2018

(65) Prior Publication Data
US 2020/0198706 A1    Jun. 25, 2020

(51) Int. Cl.
| *F16B 19/00* | (2006.01) |
| *B62D 25/08* | (2006.01) |
| *B62D 27/04* | (2006.01) |
| *F16B 9/00*  | (2006.01) |

(52) U.S. Cl.
CPC .......... *B62D 25/084* (2013.01); *B62D 27/04* (2013.01); *F16B 9/056* (2018.08); *F16B 9/07* (2018.08)

(58) Field of Classification Search
CPC ......... B62D 25/084; B62D 27/04; F16B 9/07; F16B 9/056
USPC .............................. 411/508, 45, 510; 24/297
See application file for complete search history.

(56) References Cited

U.S. PATENT DOCUMENTS

| 2,951,674 | A | * | 9/1960 | Rice ....................... | F16F 1/3732 267/141.4 |
| 3,065,342 | A | * | 11/1962 | Worden ................... | F21V 15/04 362/390 |
| 3,319,918 | A | * | 5/1967 | Rapata ..................... | B60R 11/00 248/239 |
| 4,364,427 | A | * | 12/1982 | Lefrancois .............. | B60C 29/02 152/511 |
| 4,497,516 | A | * | 2/1985 | Morita .................... | B62D 25/04 24/289 |
| 4,715,095 | A | * | 12/1987 | Takahashi ............... | F16B 5/065 24/297 |
| 4,726,722 | A | * | 2/1988 | Wollar ................ | F16B 19/1081 174/138 D |
| 4,784,550 | A | * | 11/1988 | Wollar ................ | F16B 19/1081 411/32 |
| 4,786,225 | A | * | 11/1988 | Poe ......................... | F16B 5/065 24/297 |

(Continued)

*Primary Examiner* — Gary W Estremsky

(57) ABSTRACT

An attachment is configured to connect a first connecting plate of a vehicle component to a second connecting plate of a vehicle body. The attachment includes a body, first, second and third flanges, and a press-fit insert. The attachment is of an elastically deformable material and is configured to be inserted into first and second through holes of the first and second connecting plates. The flanges engage the connecting plates when the attachment is inserted into the through holes. The body includes a hole extending longitudinally within the body to accommodate the press-fit insert. The press-fit insert has a diameter greater than the diameter of the hole to form a snug connection between the press-fit insert and the hole. The insertion of the press-fit insert into the hole elastically deforms the attachment to urge the body radially against the connecting plates to provide a robust connection between the connecting plates.

7 Claims, 7 Drawing Sheets

(56) References Cited

U.S. PATENT DOCUMENTS

| | | | | |
|---|---|---|---|---|
| 4,906,152 A | * | 3/1990 | Kurihara | F16B 37/043 |
| | | | | 411/182 |
| 5,540,528 A | * | 7/1996 | Schmidt | F16B 19/1081 |
| | | | | 24/297 |
| 5,846,039 A | * | 12/1998 | Kirchen | F16B 19/1054 |
| | | | | 411/34 |
| 6,712,571 B2 | * | 3/2004 | Krohlow | F02M 35/04 |
| | | | | 248/634 |

* cited by examiner

ATTACHMENT AND CONNECTING STRUCTURE FOR VEHICLE COMPONENT

TECHNICAL FIELD

The present disclosure relates to an attachment and a connecting structure using the attachment, for a vehicle compartment.

BACKGROUND

Attachments are configured to attach a vehicle component, such as a radiator, to a vehicle body. Generally, the vehicle component and the vehicle body each include a connecting plate with a through hole, and the vehicle component is fixed to the vehicle body by inserting the attachment into the through holes.

SUMMARY

This section provides a general summary of the disclosure and is not a comprehensive disclosure of its full scope or all of its features.

An aspect of the present disclosure may provide an attachment for connecting a first connecting plate of a vehicle component to a second connecting plate of a vehicle body. The attachment may include a body, a first flange, a second flange, a third flange, and a press-fit insert. The body may be of an elastically deformable material and be configured to be inserted into a first through hole of the first connecting plate and a second through hole of the second connecting plate. The body may include a hole extending longitudinally within the body. The first, second, and third flanges may protrude radially outward from the body. The third flange may be disposed between the first flange and the second flange to define a first space to receive the first connecting plate between the first and third flanges and to define a second space to receive the second connecting plate between the third and second flanges. The second and third flanges may be configured to elastically deform to be inserted through the first through hole of the first connecting plate and the second through hole of the second connecting plate. The press-fit insert may be configured to be tightly inserted into the hole by having a diameter greater than a diameter of the hole. The press-fit insert may be further configured to elastically deform the body to radially press the body against the first connecting plate and the second connecting plate when the body is inserted into the first through hole of the first connecting plate and the second through hole of the second connecting plate, and the press-fit insert is inserted into the hole.

An aspect of the present disclosure may further provide a connecting structure for a vehicle component. The connecting structure may include a first connecting plate of the vehicle component, a second connecting plate of a vehicle body, and an attachment. The first connecting plate may have a first through hole. The second connecting plate may have a second through hole. The attachment may include a body, a first flange, a second flange, a third flange, and a press-fit insert. The body may be of an elastically deformable material and may be configured to be inserted into the first through hole of the first connecting plate and the second through hole of the second connecting plate. The body may have a hole extending longitudinally within the body. The first, second, and third flanges may protrude radially outward from the body. The third flange may be disposed between the first flange and the second flange to define a first space to receive the first connecting plate between the first and third flanges and to define a second space to receive the second connecting plate between the third and second flanges. The press-fit insert may be configured to be tightly inserted into the hole by having a diameter greater than a diameter of the hole. The press-fit insert may be further configured to radially press the body against the first connecting plate and the second connecting plate when the body is inserted into the first through hole of the first connecting plate and the second through hole of the second connecting plate, and the press-fit insert is inserted into the hole.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

DETAILED DESCRIPTION

Figure 1:
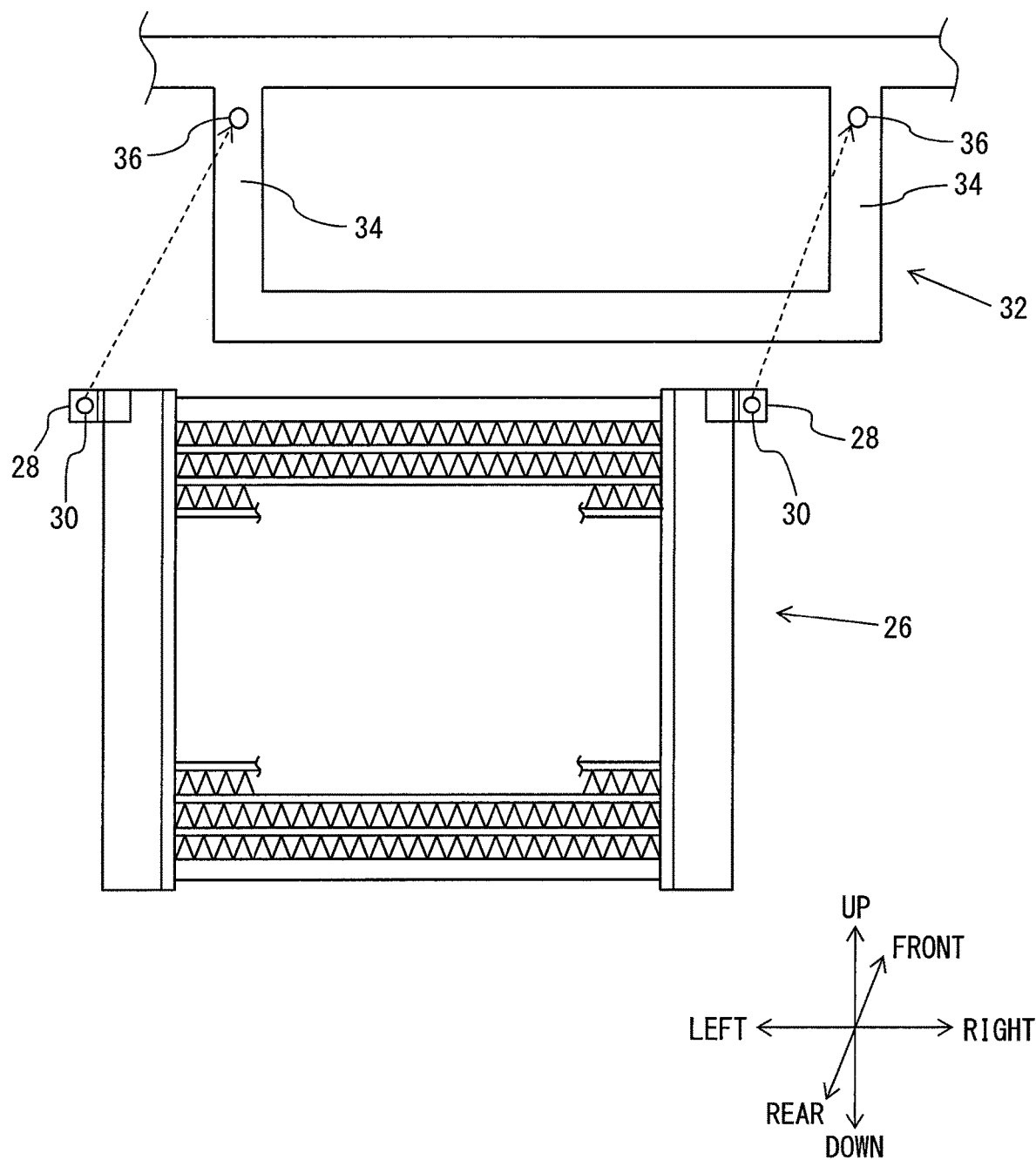
FIG. 1 illustrates a perspective view of a vehicle component and a vehicle body.

The following description is merely exemplary in nature and is not intended to limit the present disclosure, application, or uses. It should be understood that throughout the drawings, corresponding reference numerals indicate like or corresponding parts and features.

First Embodiment

As shown in FIG. 1, a vehicle component 26 may be mounted to a vehicle body 32 from one side of the vehicle body 32. It should be understood that the vehicle component 26 is not limited to a specific component. For example, the vehicle component 26 may be a radiator mounted in an engine bay of the vehicle.

In the present embodiment, the vehicle component 26 is located inside the vehicle, e.g., inside the engine bay/compartment, and may be mounted to the vehicle body 32 from a rear side of the vehicle body 32. That is, the vehicle component 26 may be limited to attaching to the vehicle body 32 in one direction, for example, from the rear side when mounted inside the engine bay. For ease of description, orientation indicators showing the up-down direction, the front-rear direction, and the left-right direction are provided in FIG. 1.

The vehicle component 26 may include one or more first connecting plates 28 with each first connecting plate 28 defining a first through hole 30. That is, the connecting plate 28 may have a hole extending through the connecting plate 28. The first connecting plate 28 may be a part of the vehicle component 26. Alternatively, the first connecting plate 28 may be formed separately from the vehicle component 26 and be attached to the vehicle component 26. For example, the first connecting plate 28 may be a bracket attached to the vehicle component 26. In the present embodiment, two first connecting plates 28 are provided at an upper-left end and an upper-right end of the vehicle component 26, respectively. The first connecting plates 28 each include the first through hole 30.

The vehicle body 32 may include one or more second connecting plates 34 with each second connecting plate 34 defining a second through hole 36. Alternatively, the second connecting plate 34 may be a single plate with one or more second through holes 36. In the present embodiment, the second connecting plate 34 may be a single plate, e.g., a single frame with the second through holes 36 provided in an upper-left portion and an upper-right portion of the vehicle body 32, respectively. When the vehicle component 26 is set to be mounted to the vehicle body 32, the first through holes 30 are aligned with the corresponding second through holes 36 along the front-rear direction. It should be understood that the second connecting plate 34 is not limited to being the single plate. For example, two second connecting plates 34 may be formed separately from the vehicle body 32 and attached to the vehicle body 32.

As described above, the first connecting plates 28 are provided at the upper-left end and the upper-right end of the vehicle component 26 respectively, in the present embodiment. However, the connecting plates 28 defining the first through holes 30 may be provided at a lower-left end and a lower-right end of the vehicle component 26, respectively. In this case, the second through holes 36 may be correspondingly defined in a lower-left end portion and a lower-right end portion of the vehicle body 32, respectively.

The vehicle component 26 is fixed to the vehicle body 32 by an attachment 12. A structure of the attachment 12 is described in greater detail with reference to FIG. 2.

Figure 2:
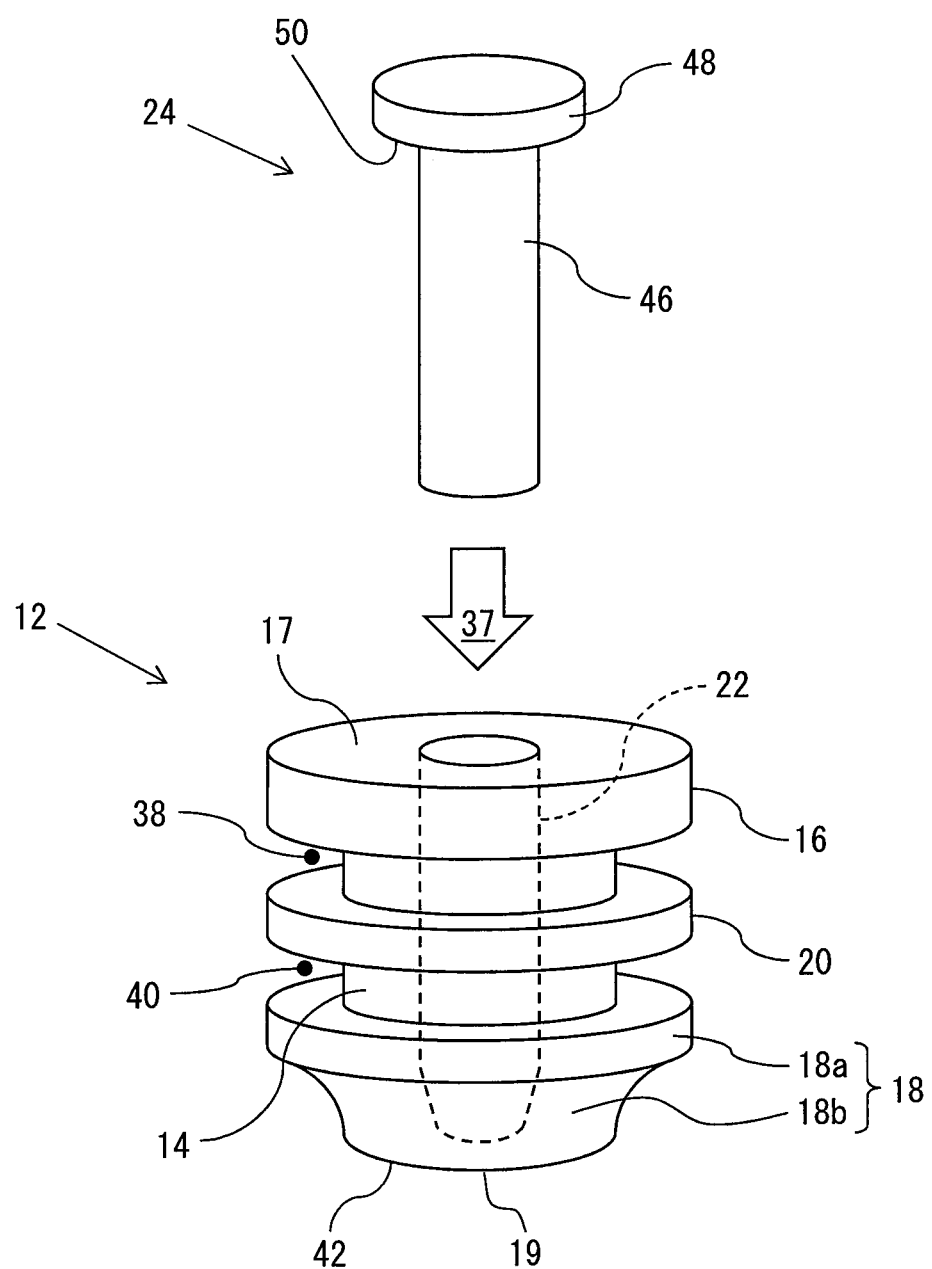
FIG. 2 illustrates a perspective view of an attachment.

As shown in FIG. 2, the attachment 12 includes a body 14, a first flange 16, a second flange 18, and a third flange 20.

The body 14 extends longitudinally and defines a hole 22 that extends longitudinally within the body 14. In other words, the body 14 includes a hole extending lengthwise within the body 14. The hole 22 may be a blind hole that extends longitudinally within the body 14 to a specific depth, for example, as shown in FIG. 2. Alternatively, the hole 22 may be a through hole extending longitudinally through the entire length of the body 14. The hole 22 is configured to receive a press-fit insert 24 described later in greater detail. The body 14 is not limited to a specific shape, but may be shaped similar to, or corresponding to the shape of the first through hole 30 and the second through hole 36, for ease of insertion into the through holes 30, 36. For example, the body 14 may be cylindrical in shape for insertion into a cylindrically-shaped through hole. The hole 22 may be disposed centrally, coaxially, or concentrically within the body.

The first flange 16 protrudes radially/laterally outward from the body 14. The first flange 16 also protrudes radially relative to the hole 22. The second flange 18 and third flange 20 similarly protrude radially outward from the body 14. Longitudinally, the third flange 20 is disposed on the body 14 between the first flange 16 and the second flange 18.

The second flange 18 may be bell-shaped. Specifically, the second flange 18 may have a flange portion 18a and a top portion 18b. The top portion 18b includes a top surface 42 and a curved surface 44. The curved surface 44 connects the top surface 42 and the flange portion 18a to each other to provide a smooth transition from the top surface 42 to the flange portion 18a. The curved surface 44 may act as a taper such that the flange portion 18a may have a greater diameter/width than the top portion 18b, with the diameter/width of the second flange tapering smoothly from the flange portion 18a to the top portion 18b along the curved surface 44.

In the present embodiment, the first flange 16 and the second flange 18 may be located on a first end 17 and a second end 19 of the body 14, respectively. The hole 22 is open (i.e., has an opening) at the first end 17 of the body 14 so that the press-fit insert 24 may be inserted into the hole 22 at the first end 17.

The first flange 16 and the third flange 20 are distanced from each other longitudinally so that a first space 38 is defined therebetween. The second flange 18 and the third flange 20 are likewise spaced apart from each other longitudinally to define a second space 40. In the present embodiment, each of the first space 38 and the second space 40 forms an annular groove between the flanges.

The body 14, the first flange 16, the second flange 18, and the third flange 20 may be molded integrally with each other to be one piece. Alternatively, the body 14, the first flange 16, the second flange 18, and the third flange 20 may be molded separately from each other and coupled to be one piece.

The attachment 12 as a whole may be made of a flexible material, such as rubber, and can be elastically deformable. Alternatively, portions of the attachment 12 may be made of an elastically deformable material, while other portions of the attachment 12 may be made of a rigid material that may not be elastically deformable. For example, the body 14, the second flange 18, and the third flange 20 may be made of a flexible material, while the first flange 16 may be made of a rigid material. As an elastically deformable material, portions of the attachment 12 can deform (e.g., expand, stretch, fold, and compress) to pass through the first through hole 30 and the second through hole 36 more easily. Additionally, the flexible material of the attachment 12 may have a damping capacity such that the attachment 12 can absorb vibrations transmitted through the vehicle component 26 and the vehicle body 32. As such, the material limits and/or prevents the attachment 12 from disengagement from the first and second through holes 30, 36 due to the vibration. Accordingly, the attachment 12 can provide a mechanically secure connection of the vehicle component 26 to the vehicle body 32.

A connecting structure for the vehicle component 26 is described in greater detail with reference to FIG. 3A, FIG. 3B, and FIG. 3C.

Figure 3A:
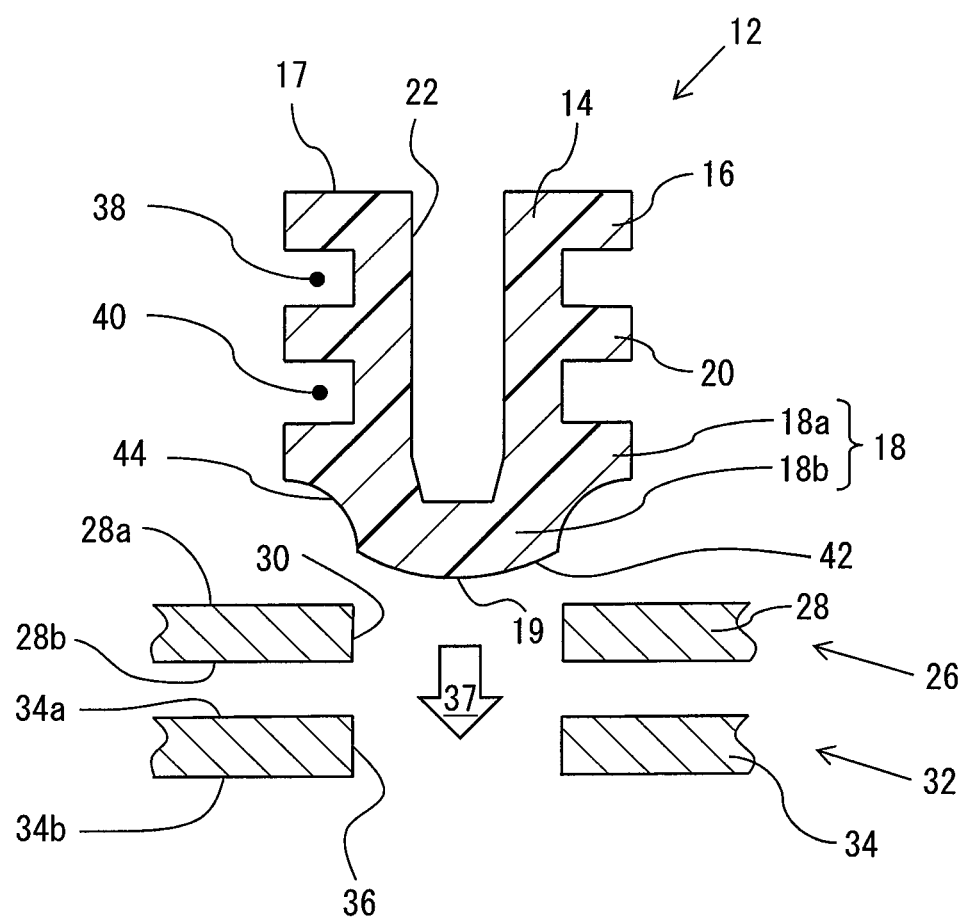
FIG. 3A illustrates a cross-sectional view of the attachment, a vehicle component, and a vehicle body.

As shown in FIG. 3A, the attachment 12 may be inserted into the first through hole 30 by first inserting the top surface 42 into the through hole 30. An example insertion direction of the attachment 12 into the first through hole 30 is shown by insertion arrow 37. The second flange 18 tapers inward from the flange portion 18a toward the top surface 42 of the top portion 18b, e.g., may have a curved shape or concavity curving inward from the flange portion 18a as shown in FIG.

3A. Thus, such tapering of the second flange 18 allows the top surface 42 to be easily inserted into the first through hole 30.

After the top surface 42 is inserted into and begins to pass through the first through hole 30, the curved surface 44 subsequently enters and begins to pass through the first through hole 30. The curved surface 44 is concavely curved and recessed toward the hole 22, curving inwardly and away from the walls of the first through hole 30 on the first connecting plate 28. As such, the curved surface 44 allows the top portion 18b of the second flange 18 to pass more easily through the first through hole 30.

Additionally, in contrast to a cylindrically shaped flange, for example first flange 16 and third flange 20, the diameter/thickness of the second flange 18 may be reduced due to the bell shape. The curve surface 44 of the bell shape reduces the diameter/thickness of the second flange 18 on portions around the top portion 18b. Such a reduction in the second flange 18 allows portions of the second flange 18 to pass through the first through hole 30 smoothly and easily.

However, it should be understood that the attachment 12 is not limited to having a bell-shaped second flange 18 with the curved surface 44. For example, the top surface 42 of the second flange 18 may be curved without including curved/concave surface 44, resulting in a dome-shaped second flange 18.

As the curved surface 44 of the second flange 18 passes through the first through hole 30, the flange portion 18a of the second flange 18 contacts the first connecting plate 28. The diameter of the flange portion 18a of the second flange 18 may be larger than the diameter of the first through hole 30. Thus, as the flange portion 18a contacts the first connecting plate 28 during the insertion of the attachment 12, the flange portion 18a begins to deform by folding away from the first connecting plate 28 in a direction opposite to the insertion direction 37 of the attachment 12. Such deformation allows the second flange 18 as a whole to pass through the first through hole 30. The second flange 18 passes through the second through hole 36 of the vehicle body 32 in the same way as passing through the first through hole 30 of the vehicle component 26.

While the second flange 18 passes through the second through hole 36, the third flange 20 passes through the first through hole 30. Thus, the body 14 is inserted into both the first through hole 30 and the second through hole 36. Like the flange portion 18a of the second flange 18, the diameter of the third flange 20 may also be larger than the diameter of the first through hole 30 and the second through hole 36. Thus, as the third flange 20 contacts the first connecting plate 28, the third flange 20 may likewise deform to allow the third flange 20 to pass through the first through hole 36.

Figure 3B:
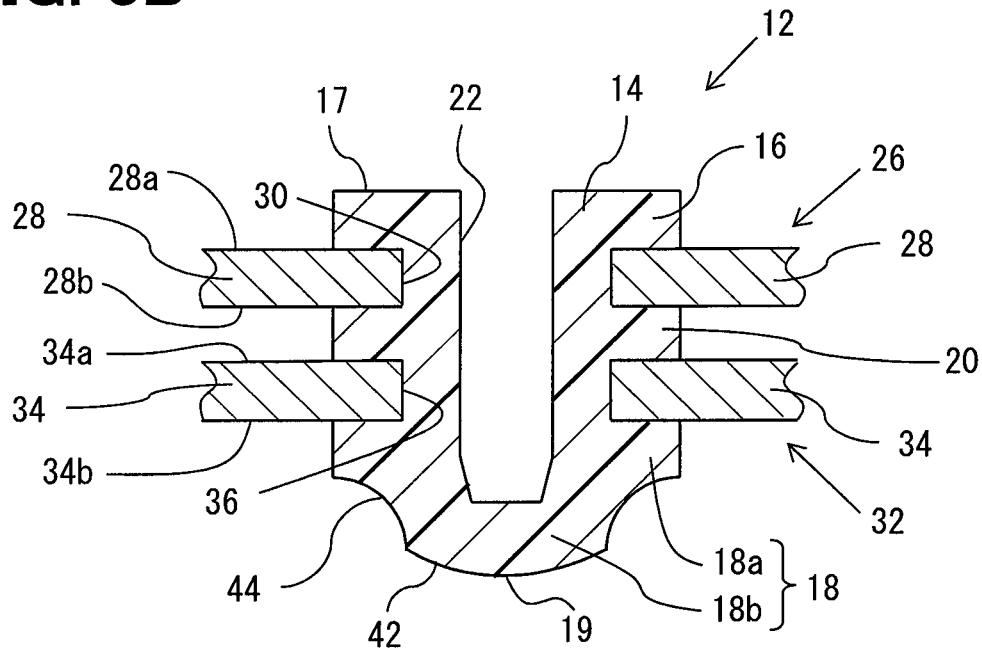
FIG. 3B illustrates a cross-sectional view of the attachment, the vehicle component, and the vehicle body.

As shown in FIG. 3B, after the second flange 18 is inserted through the second through hole 36, the attachment 12 engages the first connecting plate 28 of the vehicle component 26 and the second connecting plate 34 of the vehicle body 32.

Specifically, with reference to the orientations shown in FIG. 1, after the attachment 12 engages the first and second connecting plates 28 and 34, the first flange 16 is disposed on the rear side of the first connecting plate 28 of the vehicle component 26. The second flange 18 is disposed on the front side of the second connecting plate 34 of the vehicle body 32 and the third flange 20 is interposed between the first connecting plate 28 and the second connecting plate 34.

The first space 38, as shown in FIG. 3A, receives the first connecting plate 28 such that a first surface 28a of the first connecting plate 28 is in surface contact with the first flange 16, and that a second surface 28b of the first connecting plate 28, which faces the first surface 28a, is in surface contact with the third flange 20. The second space 40, as shown in FIG. 3A, receives the second connecting plate 34 such that a first surface 34a of the second connecting plate 34 is in surface contact with the third flange 20, and that a second surface 34b of the second connecting plate 34, which faces the first surface 34a, is in contact with the second flange 18.

Figure 3C:
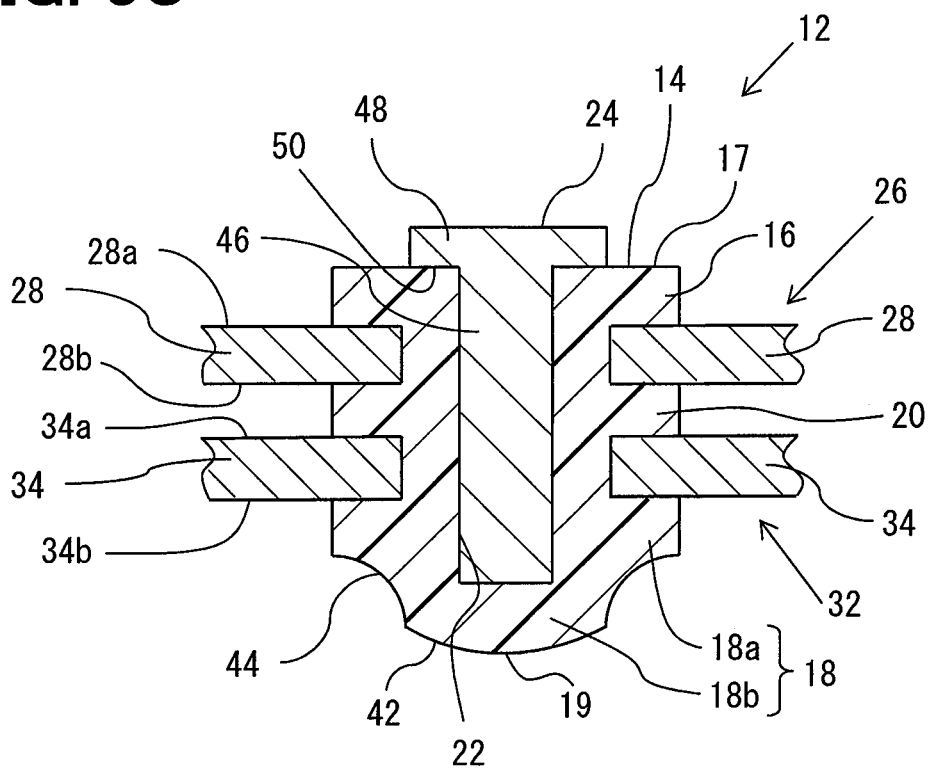
FIG. 3C illustrates a cross-sectional view of the attachment with a press-fit insert, the vehicle component, and the vehicle body.

As shown in FIG. 3C, the press-fit insert 24 is configured to be tightly inserted into the hole 22 while the first space 38 receives the first connecting plate 28 and the second space 40 receives the second connecting plate 34.

Specifically, the press-fit insert 24 includes an insert body 46 and a stopper portion 48. The insert body 46 is configured to be inserted into the hole 22, and the stopper portion 48 is configured to cover the hole 22. The stopper portion 48 may have a flat plate shape including a contact surface 50 that comes in surface contact with the first flange 16 when the press-fit insert 24 is inserted into the hole 22. The insert body 46 has an elongated shape and extends longitudinally from a center portion of the contact surface 50.

In the present embodiment, a length of the insert body 46 is such that the insert body 46 extends across the first flange 16, the second flange 18, and the third flange 20, but does not pass through the attachment 12 as a whole. That is, the press-fit insert 24 does not pass through the top surface 42 when inserted into the hole 22. The insert body 46 is not limited to a specific shape. For example, as shown in FIGS. 2, 3A, 3B, and 3C, the insert body 46 may be cylindrical in shape to correspond to the cylindrical shape of the hole 22. The insert body 46 may be shaped in a shape corresponding to the shape of the hole 22 for a smooth and easy insertion into the hole 22.

The insert body 46 has a diameter greater than a diameter of the hole 22. That is, when the insert body 46 is inserted into the hole 22, the body 14 elastically deforms to accommodate the insert body 46, thus expanding radially to press and urge the body 14 of the attachment 12 against the first connecting plate 28 and the second connecting plate 34 when the attachment is inserted into the first and second through holes 30, 36, and the flanges 16, 18, and 20 are engaging the first and second connecting plates 28, 26, as described above and illustrated in FIGS. 3B and 3C.

As a result, the insert body 46 is press-fitted into the hole 22 to form a secure connection thus limiting and/or preventing the insert body 46 from coming out of the hole 22. In other words, the insert body 46 forms a snug connection between the insert body 46 and the hole 22.

In addition, since the body 14 is pressed against the first connecting plate 28 and the second connecting plate 34, the attachment 12 can robustly engage the first connecting plate 28 and the second connecting plate 34. In other words, the attachment 12 enables the vehicle component 26 to be securely fixed to the vehicle body 32.

The stopper portion 48 serves as a stopper when inserting the press-fit insert 24 into the hole 22. That is, the stopper portion 48 limits both the insertion depth and the insertion force of the press-fit insert 24 into the hole 22. When the press-fit insert 24 does not include the stopper portion 48, the insert body 46 may be pressed against the body 14 with excessive longitudinal (e.g., insertion) force. Excessive insertion force of the press-fit insert 24 may cause the first flange 16 to be pressed through the first through hole 30 and the vehicle component 26 to be released from the attachment 12, and may cause a detachment of the vehicle component 26 from the vehicle body 32. By providing the stopper portion 48, excessive insertion force of the press-fit insert 24 on the body 14 is limited and/or prevented, thus limiting and/or preventing the vehicle component 26 from being released from the attachment 12 when attaching the vehicle component 26 to the vehicle body 32.

A diameter/width of the stopper portion 48 is large enough such that the stopper portion 48 may not be inserted into the hole 22. A shape of the stopper portion 48 is not limited to a specific shape and may be, for example, a circular shape or a rectangular shape.

In the exemplary embodiment described above, the vehicle component 26 is fixed to the vehicle body 32 by inserting the attachment 12 from only one side of the vehicle component 26. That is, the attachment 12 enables a quick and simple attachment of the vehicle component 26 to the vehicle body 32 from only one side of the vehicle component 26. As such, the attachment 12 enables the fixing of the vehicle component 26 to the vehicle body 32 in portions of the vehicle where space is limited, narrow, tight, and confined, such as the engine bay.

In the present embodiment, with reference to the orientation shown in FIG. 1, the attachment 12 engages the vehicle component 26 from the rear side of the vehicle component 26 toward the vehicle body 32. Accordingly, the first end 17 of the attachment 12 with the opening of the hole 22 is located on the rear side of the vehicle component 26. Therefore, the press-fit insert 24 is inserted into the hole 22 of the attachment 12 from the rear side of the vehicle component 26.

While the exemplary embodiment above describes the attachment 12 being inserted into the first connecting plate 28 of the vehicle component 26 and the second connecting plate 34 of the vehicle body 32 in one direction, insertion of the attachment 12 is not limited to any one direction or insertion order. That is, the exemplary embodiment described above also contemplates that the attachment 12 may be inserted in different directions than those described above, for example, from the front direction to the rear direction. In addition, the attachment 12 may first be inserted into the second connecting plate 34 of the vehicle body 32 before insertion into the first connecting plate 28 of the vehicle component 26.

Second Embodiment

A second embodiment is described with reference to FIGS. 4A, 4B, and 4C. The second embodiment differs from the first embodiment by the shape of the second flange. Parts and features in the second embodiment may have the same reference numerals as corresponding parts and features described in the preceding embodiments and a redundant description of such parts and features may be omitted.

Figure 4A:
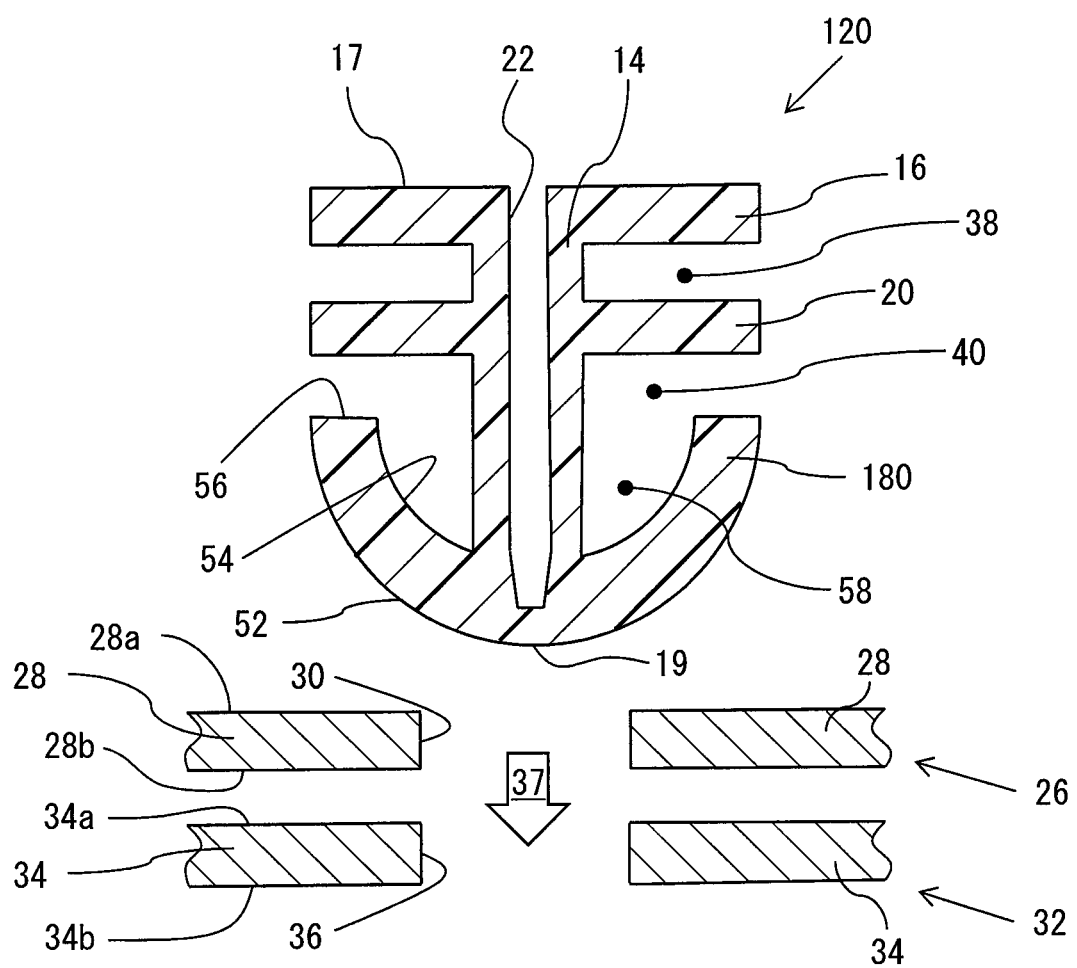
FIG. 4A illustrates a cross-sectional view of an attachment, a vehicle component, and a vehicle body.
Figure 4B:
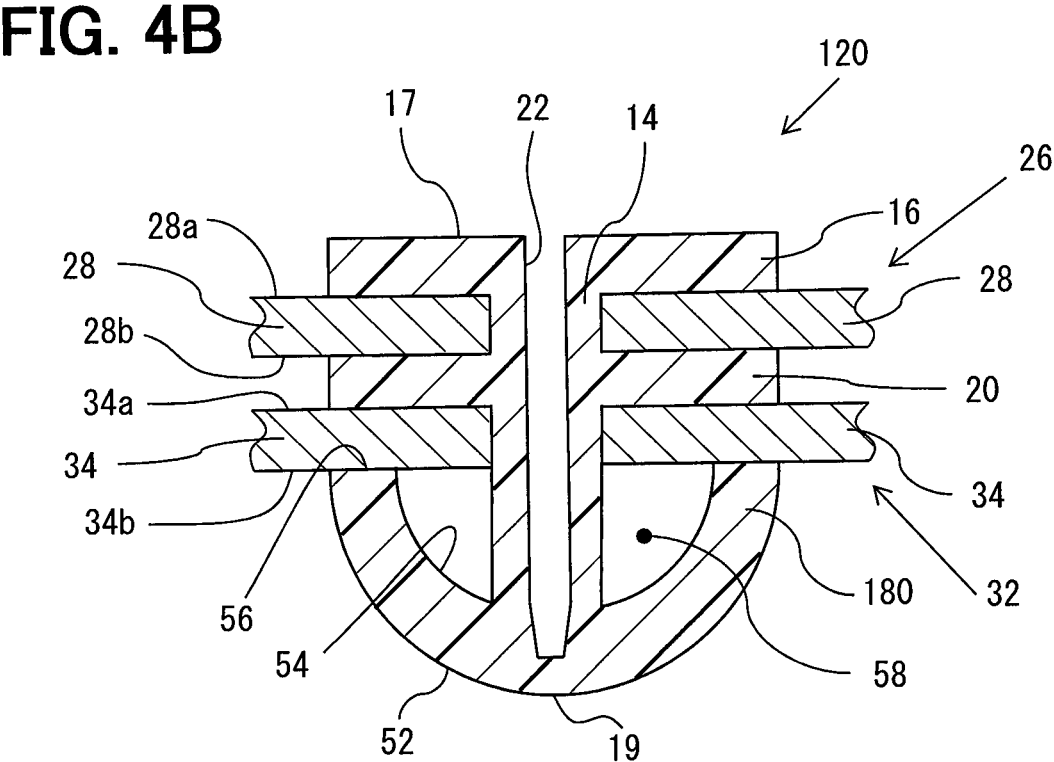
FIG. 4B illustrates a cross-sectional view of the attachment, the vehicle component, and the vehicle body.
Figure 4C:
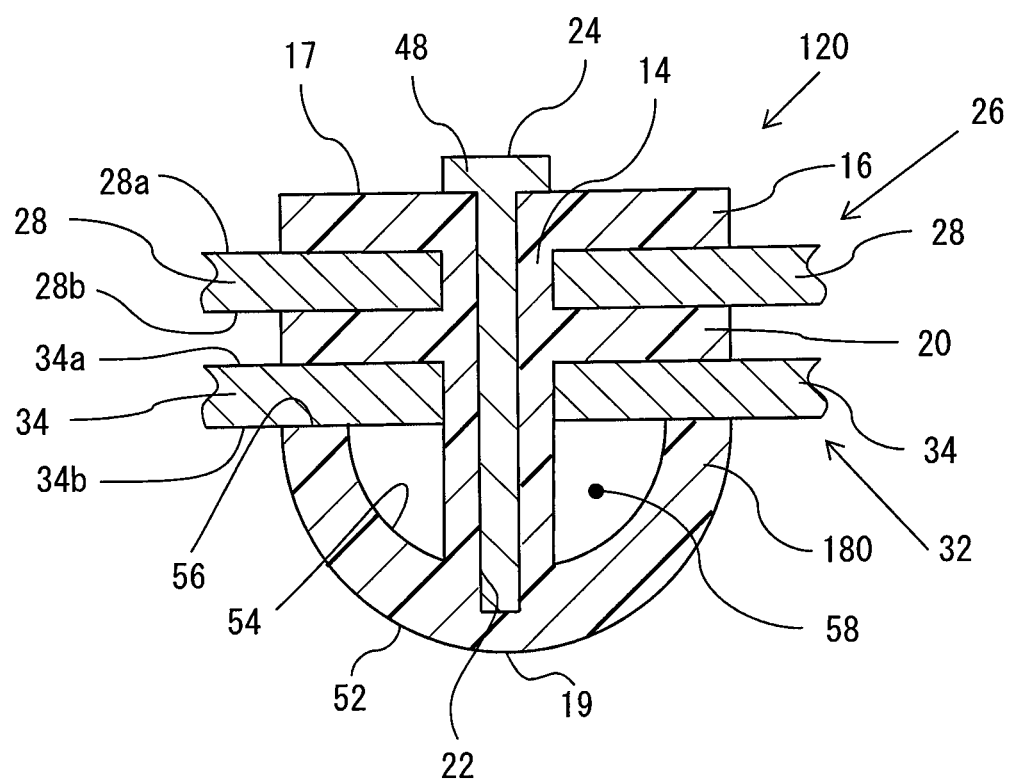
FIG. 4C illustrates a cross-sectional view of the attachment with a press-fit insert, the vehicle component, and the vehicle body.

In the present embodiment, as shown in FIGS. 4A, 4B, and 4C, an attachment 120 includes the body 14, the first flange 16, a second flange 180, and the third flange 20. The first space 38 is defined between the first flange 16 and the third flange 20, and the second space 40 is defined between the second flange 180 and the third flange 20. The first space 38 is configured to receive and engage the first connecting plate 28, and the second space 40 is configured to receive and engage the second connecting plate 34.

The second flange 180 includes an outer surface 52, an inner surface 54, and a connecting surface 56. The connecting surface 56 extends substantially parallel to the third flange 20 and connects the outer surface 52 and the inner surface 54 to each other. The inner surface 54 extends between the connecting surface 56 and the body 14. Though described and illustrated as extending substantially parallel, the connecting surface 56 is not limited to such arrangement and orientation.

Specifically, the outer surface 52 faces away from the third flange 20 and curves toward the second end 19 of the attachment 120. In other words, the outer surface 52 is curved to provide the second flange 180 with a domed shape, illustrated as a single arc shape in the cross-sectional views of FIGS. 4A, 4B, and 4C. The inner surface 54 is curved similar to the outer surface 52 so that the curves of the outer surface 52 and the inner surface 54 form parallel curves with the distance between the outer surface 52 and the inner surface 54 remaining constant to provide the second flange 180 with a uniform thickness between the outer surface 52 and the inner surface 54.

A third space 58 is defined between the inner surface 54 and the body 14. The third space 58 allows the second flange 180 to deform inwardly toward the body 14 when the second flange 180 is pressed against the first connecting plate 28 or the second connecting plate 34 during the insertion of the attachment 120 into the first and second through holes 30, 36 following the insertion direction 37. Such deformation allows the second flange 180 to more easily pass through the first through hole 30 and the second through hole 36.

As shown in FIG. 4B, the second space 40 (as shown in FIG. 4A) receives the second connecting plate 34 of the vehicle body 32 such that the first surface 34a is in surface contact with the third flange 20 and that the second surface 34b is in surface contact with the connecting surface 56 of the second flange 180.

As in the first embodiment, the body 14 defines the hole 22 extending longitudinally within the body 14. In the present embodiment, a bottom of the hole 22 is located inside the second flange 180 and is distanced from the outer surface 52. The hole 22 is configured to receive the press-fit insert 24 as shown in FIG. 4C as described in the first embodiment. Similar to the press-fit insert 24 of the first embodiment, the press-fit insert 24 of the second embodiment neither contacts nor passes through the outer surface 52.

Third Embodiment

A third embodiment is described with reference to FIG. 5 and FIG. 6. Parts and features in the third embodiment may have the same reference numerals as corresponding parts and features described in the preceding embodiments and a redundant description of such parts and features may be omitted.

Figure 5:
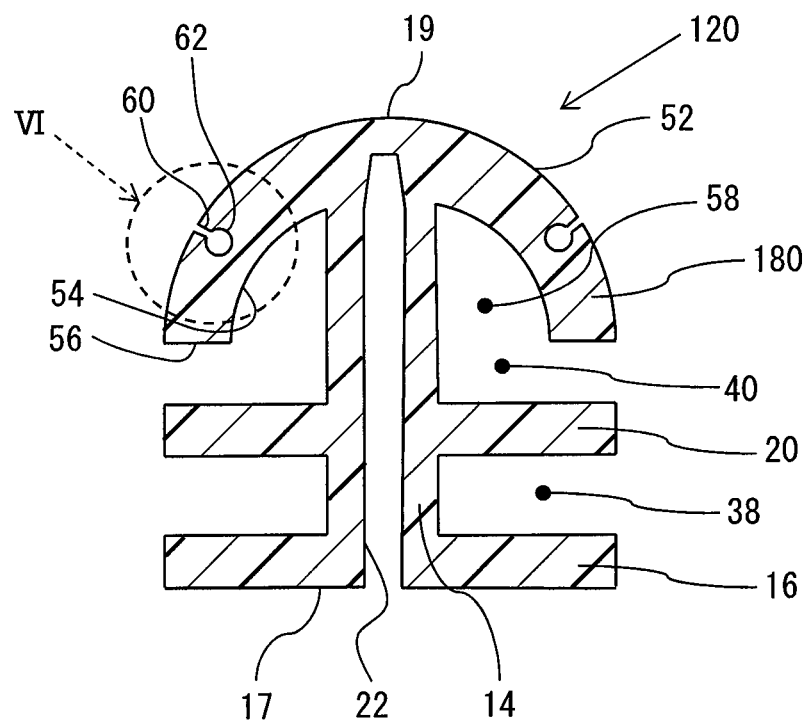
FIG. 5 illustrates a cross-sectional view of an attachment.
Figure 6:
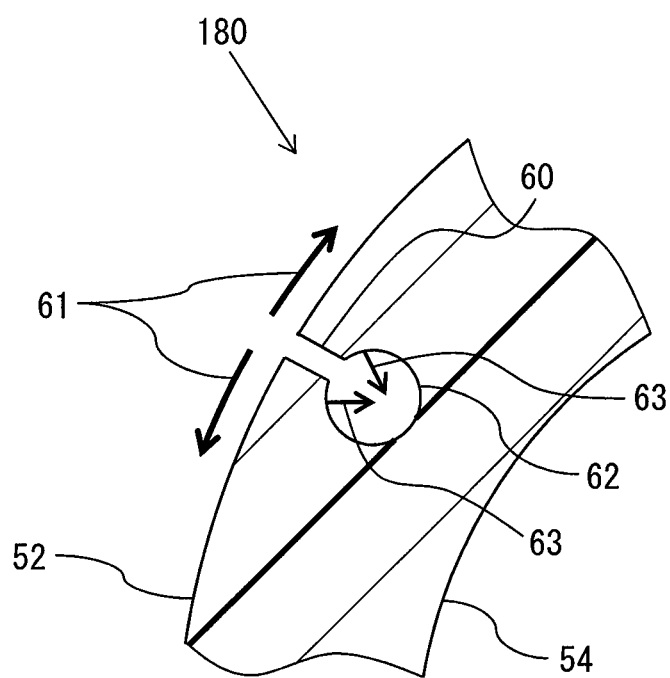
FIG. 6 is an enlarged view of a portion of the attachment shown in FIG. 5.

As shown in FIG. 5, the outer surface 52 of the second flange 180 includes a slit 60 in the present embodiment. The slit 60 extends from the outer surface 52 toward the inner surface 54. The slit 60 may be a cut/opening in the second flange 180 where a portion of the material forming the second flange 180 is removed. The slit 60 may extend continuously around the second flange 180 to form a continuous annular groove around the second flange 180. Alternatively, one or more slits 60 may be defined in the inner surface 54 (not shown). For example, the inner surface 54 may include two or more slits arranged adjacent to one another. The slit 60 allows the second flange 180 to more easily deform inwardly toward the body 14 when the second flange 180 is inserted through the holes of connection plates.

The slit 60 may include a cavity 62. The cavity 62 may be formed adjacent to the slit 60 where additional material of the second flange 180 is removed. The cavity 62 may limit and/or prevent the second flange 180 from being damaged.

The damage-limiting mechanism of the cavity 62 will be described in greater detail with reference to FIG. 6.

When the second flange 180 deforms inwardly toward the body 14, the outer surface 52 is stretched. Around the slit 60, the outer surface 52 is stretched in the directions of arrows 61 in FIG. 6. When the outer surface 52 is stretched too much, that is, beyond the elastic yield of the material of the attachment 120, the strain from overstretching may cause a crack to form in the slit 60 in the second flange 180. In this situation, the second flange 180 may break due to such cracks. Break may mean that the second flange may experience a material fracture, the second flange 180 may not return to its original shape after deformation, and the like.

In the present embodiment, the bottom of the slit 60 is provided with the cavity 62. The cavity 62 allows the force acting on the bottom of the slit 60 to be distributed, as shown by the arrows 63 in FIG. 6. As a result, the cavity 62 may limit and/or suppresses the formation of cracks, therefore limiting and/or preventing damage to the second flange 180.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as departure from the disclosure, and all such modifications are intended to be included within the scope of the disclosure.

Example embodiments are provided so that this disclosure will be through, and will convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processers, well-known device structures, and well-known technologies are not described in detail.

Spatially relative terms, such as "inner," "outer," "beneath," "below," "lower," "above," "upper," "front," "rear," "left," "right," "up," "down," and the like, may be used for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The technology used herein is for the purpose of describing particular example embodiments only and is not intended to be limiting. As used herein, the singular forms "a," and "an," and "the" may be intended to include the plural forms as well, unless the context clearly indicates otherwise. The terms "comprises," "comprising," "including," and "having," are integers, steps, operations, elements, and/or components, but do not preclude the presence or addition of one or more other features, integers, steps, operations, elements, components, and/or groups thereof.

What is claimed is:

1. An attachment for connecting a first connecting plate of a vehicle component to a second connecting plate of a vehicle body, the attachment comprising:
   a body of an elastically deformable material extending longitudinally, the body having a first end and a second end and defining a hole therein, the hole extending longitudinally within the body;
   a first flange that protrudes radially outward from the body;
   a second flange that protrudes radially outward from the body;
   a third flange that protrudes radially outward from the body, the third flange disposed between the first flange and the second flange so that a first space to receive the first connecting plate is defined between the first and third flanges and a second space to receive the second connecting plate is defined between the third and second flanges; and
   a press-fit insert configured to be inserted into the hole, the press-fit insert having a diameter greater than a diameter of the hole, wherein
   the body, the second flange, and the third flange are configured to elastically deform to be inserted through a first through hole of the first connecting plate and a second through hole of the second connecting plate,
   the press-fit insert is further configured to elastically deform the body to urge the body radially against the first connecting plate and the second connecting plate when the body is inserted into the first through hole of the first connecting plate and the second through hole of the second connecting plate, and the press-fit insert is inserted into the hole of the body,
   the second flange includes an inner surface facing the third flange and an outer surface opposing to the inner surface, and
   the second flange includes a slit extending into the second flange from the outer surface toward the inner surface.

2. The attachment according to claim 1, wherein
   the first flange is disposed on the first end of the body and the second flange is disposed on the second end of the body,
   an opening of the hole is disposed at the first end of the body, and
   the press-fit insert is further configured to be inserted into the hole of the body through the opening of the hole at the first end of the body.

3. The attachment according to claim 2, wherein
   the outer surface of the second flange faces away from the third flange and has a taper that extends toward the second end of the body.

4. The attachment according to claim 1, wherein
   the inner surface faces the third flange and is tapered toward the second end of the body.

5. A connecting structure for a vehicle component, comprising:
   a first connecting plate of the vehicle component, the first connecting plate defining a first through hole;
   a second connecting plate of a vehicle body, the second connecting plate defining a second through hole; and
   an attachment, the attachment including:
      a body of an elastically deformable material extending longitudinally, the body having a first end and a second end and defining a hole therein, the hole extending longitudinally within the body;

a first flange that protrudes radially outward from the body;

a second flange that protrudes radially outward from the body;

a third flange that protrudes radially outward from the body, the third flange disposed between the first flange and the second flange so that a first space to receive the first connecting plate is defined between the first and third flanges and a second space to receive the second connecting plate is defined between the third and second flanges; and a press-fit insert configured to be inserted into the hole, the press-fit insert having a diameter greater than a diameter of the hole, wherein the body, the second flange, and the third flange are configured to be inserted into the first through hole of the first connecting plate and the second through hole of the second connecting plate, the press-fit insert is further configured to elastically deform the body to urge the body radially against the first connecting plate and the second connecting plate when the body is inserted into the first through hole of the first connecting plate and the second through hole of the second connecting plate, and the press-fit insert is inserted into the hole of the body, the second flange includes an inner surface facing the third flange and an outer surface opposing to the inner surface, and the second flange includes a slit extending into the second flange from the outer surface toward the inner surface.

6. The attachment according to claim 1, wherein the second flange has a cavity that is formed adjacent to the slit where additional material of the second flange is removed, and the cavity allows the second flange to deform in a direction expanding the slit.

7. The connecting structure for a vehicle component according to claim 5, wherein the second flange has a cavity that is formed adjacent to the slit where additional material of the second flange is removed, and the cavity allows the second flange to deform in a direction expanding the slit.

* * * * *